Patented Aug. 13, 1940

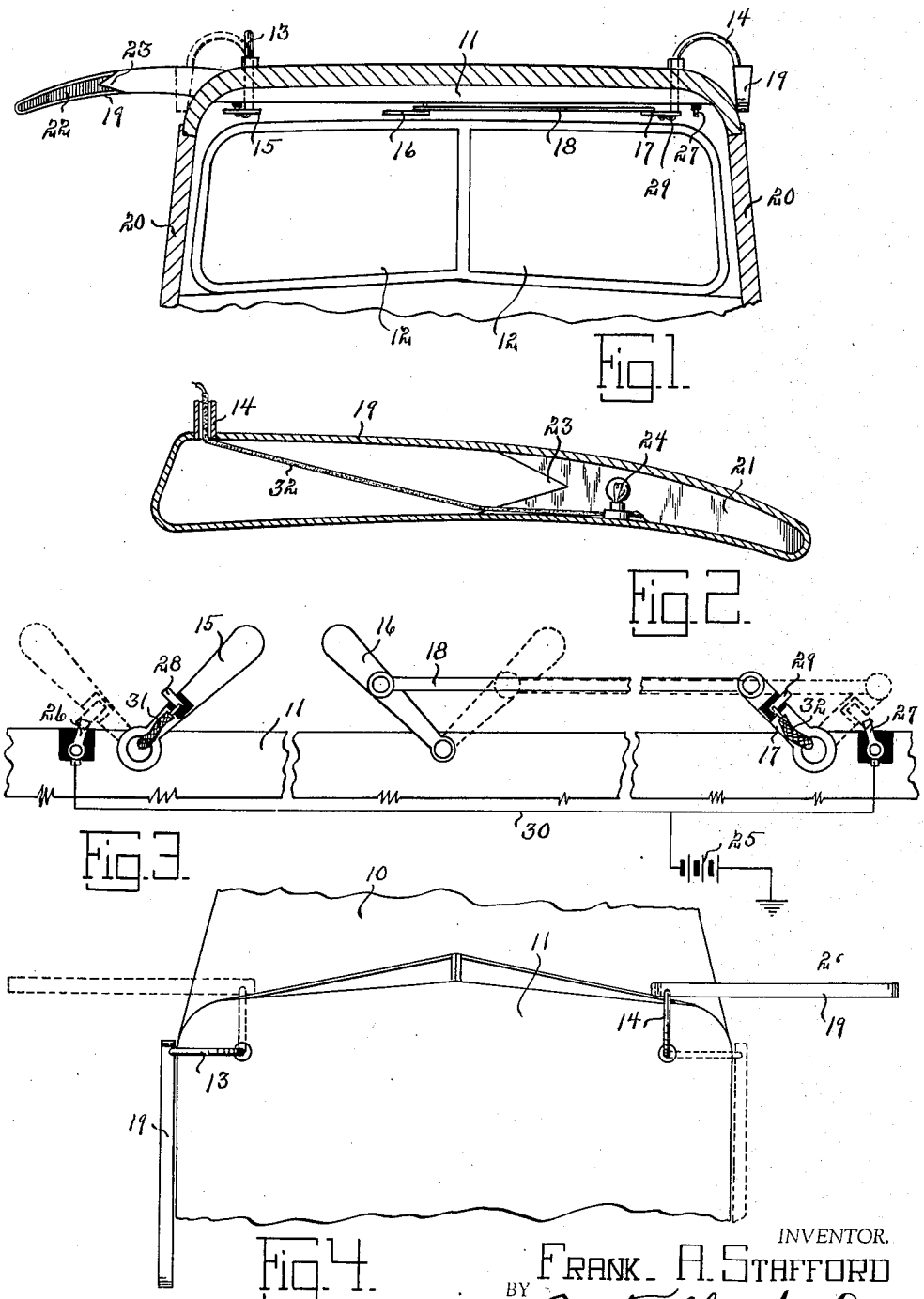

2,211,441

UNITED STATES PATENT OFFICE 2,211,441

DIRECTIONAL SIGNAL MEANS FOR AUTOMOTIVE VEHICLES

Frank A. Stafford, Conway, Iowa, assignor of one-half to Charles L. Farrens, Clarinda, Iowa Application December 12, 1938, Serial No. 245,150

2 Claims. (Cl. 116—48)

The principal object of my invention is to provide a right and left directional signalling device for automotive vehicles such as automobiles, trucks, busses and like that may be easily and quickly observed both during the hours of daylight and the hours of darkness.

A further object of this invention is to provide a directional signal for automotive vehicles that may be easily seen from positions both at the rear and in front of the vehicle on which the device is installed.

A still further object of my invention is to provide a right and left directional signalling apparatus that is easily operated by the driver of the vehicle on which the device is installed.

A still further object of my invention is to provide a right and left directional signalling means for automotive vehicles that is easily installed, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a cross sectional view of the upper portion of an automotive vehicle taken on a line just back of the windshield of the vehicle and shows my directional signalling means installed and ready for use.

Fig. 2 is a longitudinal sectional view of one of the signalling arms of the device.

Fig. 3 is a bottom plan view of the manually operated control handles, switches, and a schematic showing of the wiring of the device.

Fig. 4 is a top plan view of the forward end portion of the cab of the vehicle showing my signalling device attached to the same.

The principal objections to most of the directional signalling devices now in use are that they are bulky, complicated and cannot be observed from positions both in the rear and in front of the vehicle on which they are installed. Furthermore, many of such devices for signalling operate automatically in that they are operatively connected to the steering mechanism of the vehicle. Obviously, such devices do not operate before the turn is started. I have overcome such objections as will hereinafter be appreciated.

Referring to the drawing, I have used the numeral 10 to designate an automotive vehicle having the usual driver's cab compartment 11 and windshield 12. It is to such a vehicle that I secure my directional signalling device and which I will now describe in detail. The numeral 13 designates an inverted U-shaped supporting tube member having one end rotatably extending through the left hand top portion of the cab 11 as shown in Fig. 1. The numeral 14 designates a similar inverted U-shaped supporting tube member having one of its end portions extending through the top right hand portion of the cab 11. These members 13 and 14 have their inner end portions journaled for rotation in the cab 11 and are capable of having their outer end portions swung to the side of the cab portion 11 or swung to the front end of the cab portion 11 as shown in Fig. 4. The numeral 15 designates a handle member rigidly secured on the inner end of the member 13 and positioned inside the seating compartment of the vehicle. This handle 15 is so positioned on the member 13 that it extends rearwardly and to the right when the free end of the member 13 is at the side of the cab portion 11. The numeral 16 designates a similar handle member having its forward end pivotally secured by any suitable means to the inside top of the cab 11. These two handle members 15 and 16 are positioned at the inside upper left hand portion of the cab 11 in order to be directly in front of the driver of the vehicle. The handle member 15 is spaced apart and positioned to the left of the handle member 16. The numeral 17 designates an arm member having one end rigidly secured to the inner end of the member 14. The numeral 18 designates a link member having one end pivoted to the free end of the member 17 and its other end pivoted to the center portion of the member 16 as shown in Fig. 3. These members 15, 17, 18 and 16 are so arranged that when the free end of the member 14 is at the side of the cab 11, the handle member 16 will extend rearwardly and to the left. The numeral 19 designates a signalling arm rigidly secured to the outer end portion of each of the members 13 and 14. These signalling arms are so placed on the members 13 and 14 that when the members 13 and 14 have their outer free end portions to the sides of the cab 11, these signalling arms 19 will rest at the side of the cab and be longitudinally of the vehicle just above the doors 20 of the vehicle. When the free ends of the members 13 and 14 are swung to positions in front of the cab 11, then these arms 19 will extend outwardly in both directions from the vehicle as shown in Fig. 4. Each of these arms 19 are hollow and have at their outer end portions a front window 21 and a back window 22. These windows are closed with suitable glass or like which may be colored. The inner sides of the windows may be pointed as designated by the numeral 23 to give the windows the appearance of an arrow or like as shown in Fig. 1. The numeral 24 designates an incandescent light bulb and supporting socket inside each of the arms 19. These bulbs have one of their poles grounded to the device and to the vehicle and are located between the front and rear window of the arm in which they are placed. The numeral 25 designates a source of electrical energy. The numeral 26 designates an electrical contact point secured to the cab 11 and positioned at the left of the handle member 15. The numeral 27 designates a similar electrical contact point secured to the inside of the cab 11 and positioned to the right of the member 17. The numeral 28 designates an electrical contact point suitably secured to the handle 15 and capable of engaging the contact point 26 when the handle member 15 is moved to the left as shown in dotted lines in Fig. 3. The numeral 29 designates an electrical contact point on the member 17 capable of electrically engaging the contact point 27 when the member 17 is moved to the right as shown by dotted lines in Fig. 3. The numeral 30 designates an electric lead wire electrically connecting the contact points 26 and 27 to the positive side of the source of electric energy 25. The numeral 31 designates an electric lead wire having one end electrically connected to the contact point 28 and its other end connected to the free pole of the bulb 24 in the arm 19 which is secured to the member 13. This lead wire 31 extends from the contact point 28 through the member 13 and thence into the inside of the arm 19 secured to the member 13. In the same manner, an electric lead wire 32 is connected to the contact point 29 and extends through the member 14 into the hollow arm 19 secured to the member 14 and thence to the free pole of the bulb 24 inside that arm.

By this arrangement of parts, when it is desired to make a left hand turn, it is merely necessary to move the handle member 15 to the left thereby bringing the signalling arm 19 on the left side of the vehicle to an outwardly extending position as shown by dotted lines in Fig. 4. Obviously, during the hours of daylight, this arm can easily be observed from a position in the rear of the vehicle or from a position in front of the vehicle, and the observer will note that the vehicle is going to make a left hand turn. Also, when the handle member 15 is moved to the left, the contact point 28 will come into engagement with the contact point 26 and the bulb inside the arm 19 on the left hand side of the vehicle will be illuminated, making it possible for the arm to be seen during the hours of darkness as well as during the hours of daylight. After the turn has been made, the handle 15 is moved to its normal position as shown in Fig. 3, thereby bringing the arm 19 to an adjacent position with the top of the vehicle just above the left hand door. When it is desired to make a right hand turn, the handle member 16 is moved to the right, thereby bringing the signalling arm 19 on the right hand side of the car to an extended signalling position as shown in Fig. 4. Also when the arm 16 is moved to the right, the contact point 29 will engage the contact point 27 and the bulb inside the signalling arm on the right hand side of the vehicle will be illuminated. After the turn has been completed to the right, the handle member 16 is moved to the left and into a normal position, thereby bringing the arm 19 to an adjacent position along the right side of the vehicle as shown by dotted lines in Fig. 4. Obviously, when the handle members 15 and 16 are in normal positions, the electric circuits will be broken and the arms will not be illuminated. If the driver of the vehicle wishes to signal that he is going to stop or slow down, he may move both of the levers 15 and 16 so that both of the arms 19 will extend outwardly transversely of the longitudinal axis of the vehicle. The handle members 15 and 16 are conveniently located in front of the driver and just above the windshield and he can easily observe at all times the positions of the signal arms.

Some changes may be made in the construction and arrangement of my improved directional signal means for automotive vehicles without departing from the real spirit and purpose of my invention, and it is my intention to cover by my claims any modified forms of structure or use of mechanical equivalents which may be reasonably included within their scope.

I claim:

1. In a device of the class described, an inverted U-shaped member designed to have its inner leg portion rotatably extending through one of the upper forward corner portions of the seating compartment of a vehicle, a signaling arm having its rear end secured to the end of the outer leg portion of said inverted U-shaped member, and a handle member operatively secured to that end of said inverted U-shaped member that is designed to be rotatably extended through one of the upper forward corner portions of the seating compartment of a vehicle; said inverted U-shaped member permitting the movement of the rear end portion of said signaling arm to a position in front of the seating compartment of a vehicle to which it is secured when said inverted U-shaped member is rotated in one direction.

2. In a device of the class described, an inverted hollow U-shaped member designed to have its inner leg portion rotatably extending through one of the upper forward corner portions of the seating compartment of a vehicle, a signaling arm having its rear end secured to the end of the outer leg portion of said inverted hollow U-shaped member, and a handle member operatively secured to that end of said inverted hollow U-shaped member that is designed to be rotatably extended through one of the upper forward corner portions of the seating compartment of a vehicle; said inverted hollow U-shaped member permitting the movement of the rear end portion of said signaling arm to a position in front of the seating compartment of a vehicle to which it is secured when said inverted hollow U-shaped member is rotated in one direction.

FRANK A. STAFFORD.